Dec. 19, 1933. A. E. KILPELA 1,940,455
GEAR RETAINING MEANS
Filed Oct. 27, 1930
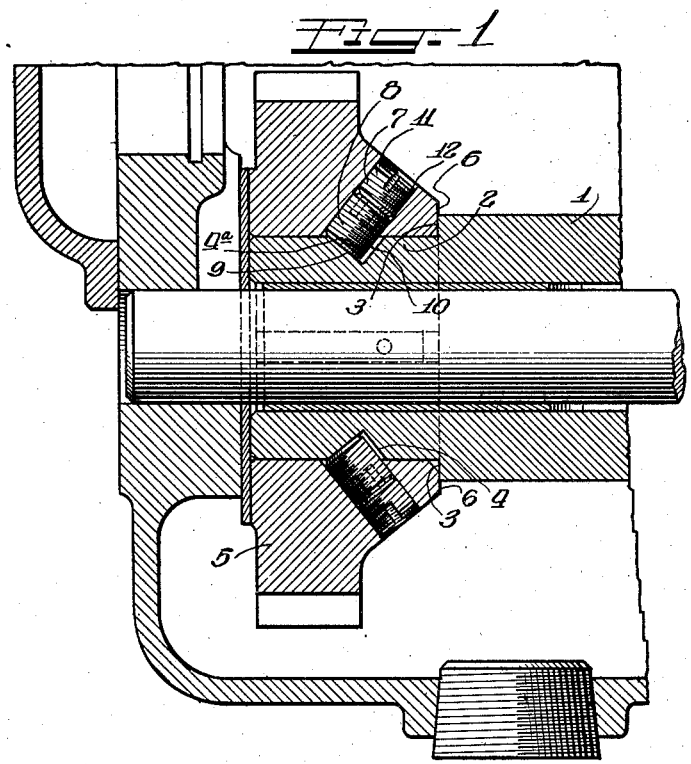
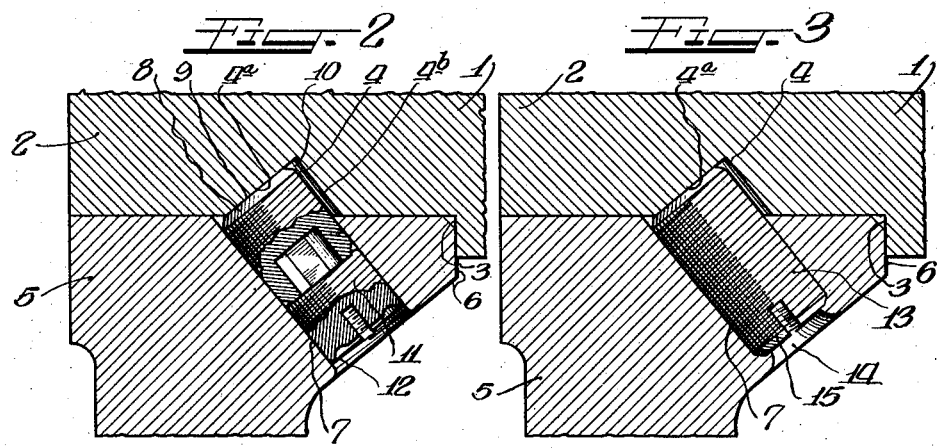
Inventor:
Ano E. Kilpela.
by: Charles T. Hills Atty.

Patented Dec. 19, 1933

1,940,455

UNITED STATES PATENT OFFICE 1,940,455

GEAR RETAINING MEANS

Ano E. Kilpela, Detroit, Mich., assignor to Detroit Gear & Machine Company, Detroit, Mich., a corporation of Michigan Application October 27, 1930. Serial No. 491,363

1 Claim. (Cl. 287—53)

This invention concerns itself with means for fastening a gear or the like on a spindle, arbor, shaft or the like.

In certain classes of mechanisms, as for example, in motor vehicle transmissions, the problem of adequately securing a hardened steel gear on a hardened steel shaft often presents itself, especially when it is desired that the connection be permanent and involve a simple operation and a minimum of parts. To be sure, it would be desirable if the gear could be made integral with the shaft, but, as is especially true of transmissions, the problem of assembly of the various parts of the mechanism does not permit of such construction.

It is accordingly one of the principal objects of the invention to provide an extremely simple means for permanently securing a hardened steel gear or the like to a hardened steel arbor or the like.

A further object of the invention resides in the provision of means for preventing relative rotation and translation of a gear or the like on a shaft, said means having the effect, in the event of a stress tending to separate the parts, of further tightening the connection.

In carrying out my invention, I provide the shaft and gear with communicating openings angularly disposed to the axis of the shaft and gear, and locate a hardened steel screw in said opening. A second screw preferably of soft steel is located in the gear opening over the first screw, the soft edges of the soft screw being peened against the wall of the gear opening to thereby permanently hold the screws in place. If desired, I may employ only a single hardened screw, and weld the portion of the gear adjacent the screw opening to said screw, or soften said gear portion, if necessary, as by an electric arc, so that the same may be peened or otherwise upset to project into the opening to prevent outward movement of the screw.

While preferably suitable key or splined means may serve to establish a driving connection between the gear and its shaft, this function may, if desired, devolve upon the screw means, as many as deemed necessary being availed of.

Other and further important objects of this invention will be apparent from the disclosures in the specification and the accompanying drawing.

This invention (in a preferred form) is illustrated in the drawing and hereinafter more fully described.

On the drawing:

Figure 1 is a fragmentary sectional view showing one form of the invention in connection with an automobile transmission, certain parts appearing in elevation.

Figure 2 is an enlarged fragmentary sectional view, partly broken away to show the gear retaining means in detail.

Figure 3 is a view similar to Figure 2, but showing a modified form of the invention.

In the form of the invention shown in Figure 1, the hardened steel countershaft 1 is reduced at 2 and provided with a circumferential shoulder 3. The reduced portion 2 is provided with a notch 4 having a flat wall 4a extending at any desired angle with the axis of shaft 1, the angle shown being approximately 45°. A hardened steel gear 5, preferably helical, is received on the reduced portion 2 of the shaft 1, the inner side 6 of the gear 5 being in abutment with the shoulder 3 of the shaft 1. The gear 5 is provided with a tapped opening 7 inclined at substantially a right angle with respect to the notch wall 4a, the wall of the opening 7 being preferably somewhat offset from the wall 4b of the notch 4 as shown when the side 6 of the gear 5 is in abutting relationship with the shoulder 3 of the shaft 1.

A hardened steel screw 8 is threaded into the opening 7 and has a flat bottom 9 for engagement with the flat wall 4a of the recess 4. By reason of the wall of the opening 7 being offset from the wall 4b of the notch 4, as heretofore mentioned, it will be apparent that when the hardened screw 8 projects into the opening 4, as shown, a space 10 allowing for tightening of the screw 8 is provided. Thus when the gear 5 is placed on the reduced portion 2, an extremely tight fit is provided by screwing the screw 8 home until the flat walls 9 and 4a interengage, the wall 4a serving as a cam to force the side 6 of the gear 5 into tight abutting engagement with the circumferential shoulder 3 of the shaft 1.

When the desired degree of tightness is obtained, then, in accordance with one form of the invention, a soft steel screw 11 is threaded into the opening 7 until it tightly seats on the top of the screw 8. The outer periphery of the top of the soft screw 11 is then peened against the adjacent wall of the threaded opening 7, as indicated at 12, thereby providing a permanent connection between the gear 5 and shaft 1 and inhibiting outward movement of the screws.

By providing a hardened steel screw 8, said screw is capable of withstanding the shearing stresses to which it is subject when in use, as in the case of a constant mesh helical gear transmission wherein the gear 5 is in constant mesh with the drive gear of the engine shaft of such transmission and is subjected to end thrust due to the helical gear.

If desired, the soft screw 11 may be eliminated and an elongated hardened steel screw 13 employed, its length being such that when screwed home, its top 15 is disposed adjacent the end 14 of the threaded opening 7. The rim portion of the gear 5 adjacent the end 14 of the opening 7 may be softened by any desirable means, such as by applying heat thereto, whereupon the same may be peened or otherwise upset to project into the end 14 of the opening 7 and engage the top 15 of the screw 13, thus permanently preventing movement of the hardened steel screw in the opening 7, in a direction away from the axis of the shaft 1. Any other suitable means may be employed for preventing movement of the screw, as that provided by welding the top of the screw to the gear.

It will thus be seen that by my invention a gear and shaft may be securely fastened together against relative movement in an axial direction due to end thrust resulting from the use of helical gearing, in a manner involving a minimum of time and effort for assembly of the parts and involving an extremely low cost.

It will be noted that each of the screws is provided with suitable notches or recesses for reception of a tool to actuate the same.

I am aware that numerous details of construction may be varied through a wide range without departing from the principles of this invention, and I, therefore, do not purpose limiting the patent granted, otherwise than necessitated by the prior art.

It is to be noted that the retaining means of this invention is intended primarily for resisting end thrust due to the employment of helical gearing, and that accordingly the gear 5 is preferably drivably connected to the shaft 1 by key means as shown in dotted lines in Figure 1.

It is to be understood that the shoulder 3 may be obviated by the use of a retaining means such as set forth hereinabove, directed at an inclination to the arbor or shaft 1, but away from the end 2 thereof. Moreover, it is to be further understood that the invention is obviously not limited in its use to the retaining of a hardened gear or the like on a hardened shaft or the like, but is also susceptible of being employed in the securement of parts of relatively soft metal.

I claim as my invention:

In a device of the class described, an arbor provided with a reduced end forming a circumferential shoulder, a member provided with a hub engaging said reduced end and in abutting relation with said shoulder, said reduced portion having a notch provided with an inclined wall, said hub having an inclined opening communicating with said notch, said opening being threaded and receiving a screw, said screw having an end engageable with the wall of said notch, said wall facing the circumferential shoulder of the arbor, whereby as said screw is tightened against said wall, the latter acts as a cam to force the hub in tighter engagement with the circumferential shoulder, said notch being of a depth in excess of the maximum extent to which the screw can project thereinto, so that tightening of the screw is unobstructed, said arbor, hub and screw being of hardened steel, a soft screw disposed in the threaded opening and in abutting relationship with the hardened screw, said soft screw being upset into permanent engagement with the thread of said opening, whereby to prevent movement of the screw in said opening.

ANO E. KILPELA.